No. 719,179. PATENTED JAN. 27, 1903.
F. P. BRINING.
VEHICLE TIRE.
APPLICATION FILED JULY 3, 1902.
NO MODEL.
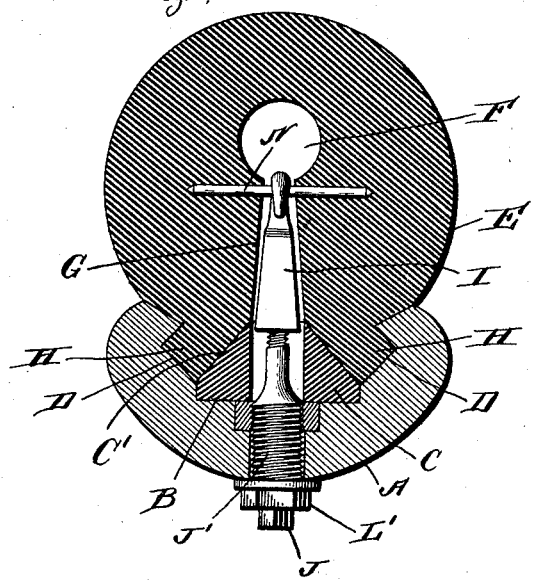
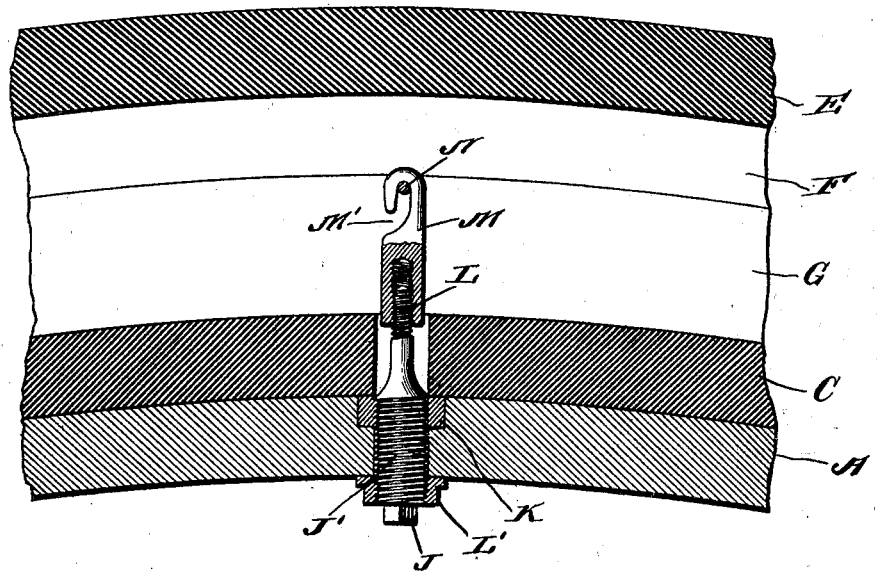
Witnesses
Louis D. Heinrichs
L. H. Morrison
Inventor
Frank P. Brining
By his Attorney

United States Patent Office.

FRANK P. BRINING, OF WESTGROVE, PENNSYLVANIA.

VEHICLE-TIRE.

SPECIFICATION forming part of Letters Patent No. 719,179, dated January 27, 1903.

Application filed July 3, 1902. Serial No. 114,180. (No model.)

*To all whom it may concern:*

Be it known that I, FRANK P. BRINING, a citizen of the United States, residing at Westgrove, county of Chester, and State of Pennsylvania, have invented a certain new and useful Improvement in Vehicle-Tires, of which the following is a specification.

My invention relates to a new and useful improvement in vehicle-tires, and has for its object to provide a vehicle-tire which will not depend upon the pneumatic tire for its resiliency, but will at the same time have all the resiliency and advantages of the pneumatic tire without the disadvantages attendant thereto; and a further object of my invention is to provide for the easy insertion and removal of the tire to and from the felly and providing at certain intervals retaining devices which absolutely prevent the tire from displacement under any and all circumstances, but provide for its easy and quick removal when desired.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a vertical cross-section of the tire and felly; Fig. 2, a longitudinal section of a portion of the tire and felly.

This invention is intended as an improvement over a patent allowed me March 8, 1902, on vehicle-tires, Serial No. 93,992, and the tire and felly of this my present application are practically the same as in the former one; but in this application I have included retaining devices which are located at intervals around the felly for the purpose of preventing the displacement of the tire from the felly should the tire be subjected to any unusual side strain, such as going around curves, &c.

A represents the felly of the wheel, which has the annular groove B formed therein, in which is cemented or secured in any suitable manner a ring of comparatively soft rubber C. The walls of the groove B are grooved and undercut at D, as shown in Fig. 1.

E is a tire which consists of a solid ring of rubber having a circular opening F formed therethrough, and this tire is split from the opening F to its edge, as illustrated at G, and has formed therewith the tongues H, which are adapted to fit in the undercut groove D of the felly. The soft-rubber ring C is beveled at C' upon its outer edge, and the inner face of the tire E is beveled to correspond upon each side of the slit G. Thus when it is desired to insert the tire in the felly the tongues or beveled edges H upon the tire are pressed or sprung within the undercut grooves D of the felly, and the expansion of the rubber tire E, together with the wedging expansion of the soft rubber C, will tend to hold the tire in place upon the felly, and when the weight of the rider or vehicle is upon the tire the tendency of the wedge-face of the ring C will be to cause the two portions of the tire upon each side of the slit G to spread and to be more closely held within the undercut groove D of the felly, so that the heavier the weight placed upon the vehicle the more tendency the tire has to hold itself in conjunction with the felly, and at the same time the soft-rubber ring C, the opening F, and slit G will give to the tire a great resiliency equal to the pneumatic tire.

Although the tire as just described would when used on bicycles or other light vehicles probably be retained in place and never become displaced from the felly, said tires might when attached to heavy vehicles or when designed for fast traveling become detached from the felly when subjected to an unusual side strain, such as when the vehicle is turning a sharp curve. Therefore to provide against any such liability I provide the screw-hook I, which is composed of two portions, a male and female. The male portion is provided with a squared outer end J for the purpose of providing a wrench-hold, and the outer end of the male portion inside of the squared end J is cylindrical and exteriorly threaded, as indicated at J', and passes through an opening provided through the felly and is threaded in a nut K, embedded in a recess extending downward from the groove B of the felly.

This male portion is reduced upon its extreme inner end and is exteriorly threaded, as illustrated at L, and is threaded into the female portion represented by the interiorly-threaded hook M, which hook passes through an opening provided through the ring C and lies within the slit G of the tire E and is adapted to hook over a transverse pin N, embedded in the tire. This pin may either be vulcanized in the tire or may be inserted in the tire after it is made by spreading the tire and placing the sharp-pointed pin against the walls of the slit G. Then by forcing the tire to its normal position the pin will enter the tire upon each side of the slit. These retaining devices are arranged at intervals around the wheel and are secured to the tire in the following manner: The hook is unscrewed from the screw-threaded end L a sufficient distance so that when it is inserted through the opening formed through the felly and also through the ring C the pin N will be opposite the throat M' of the hook, and then by pressing the pin into the hook and threading the male portion both into the nut K and into the hook M the hook will be drawn toward the felly, and thus bind the tire by means of the pin to the felly, so as to prevent absolutely displacement of the tire. For the purpose of preventing any movement of the retaining device relative to the felly after the retaining device has been properly adjusted a jam-nut L' is threaded upon the protruding end of the threaded portion J' and screwed tight against the inner surface of the felly or against the washer interposed between the nut and the felly, so as to bind the retaining device securely against any movement, the pin N working freely within the hook as the tire is compressed or allowed to expand.

Of course I do not wish to be limited to the exact construction here shown, as slight modifications could be made without departing from the spirit of my invention.

Having thus fully described my invention, what I claim as new and useful is—

1. A felly having an annular groove formed in the same, a ring of soft rubber secured within said groove, undercut grooves formed in the walls of the groove, a rubber tire, beveled edges or tongues formed upon the tire adapted to fit within the undercut grooves, an opening formed through the tire, a slit formed from the opening to the inward face of the tire, pins arranged at intervals in the tire and extending laterally across the slit, hooks extending through the felly and also through the soft-rubber ring adapted to be hooked upon said pins, means for drawing said hooks toward the felly for the purpose of binding the tire to the felly, as and for the purpose specified.

2. In a vehicle-wheel tire, a felly, a rubber ring clenched within said felly, an opening formed through the tire, a slit formed from the opening to the inner face of the tire, pins arranged within the tire and extending transversely across the slit, hooks consisting of two parts, a male and female, the male part extending through the felly and threaded into the female part, a nut threaded upon the male part outside of the felly, a hook formed upon the female part adapted to hook over the pin, as and for the purpose specified.

3. In a device of the character described, a felly, a rubber tire carried by said felly, pins arranged within the tire, retaining devices each consisting of two parts, a male and female, the male part extending through the felly and threaded into the female part, a nut threaded upon the male part outside of the felly, and a hook formed upon the female part adapted to hook over the pin in the tire, as and for the purpose specified.

4. In combination with a tire and felly of the character described, pins arranged at intervals in the tire and extending transversely of the same, tire-retaining devices each consisting of two parts, a male and female, the male part extending through the felly, a nut embedded in the felly in which the male part is threaded, a reduced portion formed upon the male part threaded into the female part, a lock-nut threaded upon the male part upon the outside of the felly, and a female part provided with a hook adapted to hook over the pin in the tire, as and for the purpose specified.

In testimony whereof I have hereunto affixed my signature in the presence of two subscribing witnesses.

FRANK P. BRINING.

Witnesses:
H. B. HALLOCK,
L. W. MORRISON.